United States Patent [19]

Ebersberger

[11] Patent Number: 4,628,522
[45] Date of Patent: Dec. 9, 1986

[54] X-RAY TUBE WITH A MAGNETICALLY SEATED ROTARY ANODE

[75] Inventor: Hans Ebersberger, Kotzenaurach, Fed. Rep. of Germany

[73] Assignee: Siemens Aktiengesellschaft, Berlin and Munich, Fed. Rep. of Germany

[21] Appl. No.: 693,039

[22] Filed: Jan. 22, 1985

[30] Foreign Application Priority Data

Feb. 28, 1984 [DE] Fed. Rep. of Germany ....... 3407269

[51] Int. Cl.⁴ ......................... H01J 35/04; H01J 35/10
[52] U.S. Cl. ..................................... 378/132; 310/90.5
[58] Field of Search ....................... 378/131, 132, 125; 308/10

[56] References Cited

U.S. PATENT DOCUMENTS 4,167,671 9/1979 Boden et al. ........................ 378/131
4,468,800 8/1984 Friedel et al. ....................... 378/132
4,504,965 3/1985 Ebersberger ....................... 378/132

Primary Examiner—Craig E. Church
Assistant Examiner—T. N. Grigsby
Attorney, Agent, or Firm—Hill, Van Santen, Steadman & Simpson

[57] ABSTRACT

An x-ray tube has a rotary anode which is seated in a magnetic bearing unit which includes catcher bearings for supporting the anode system if the magnetic bearing is turned off or malfunctions. For this purpose the drive shaft of the rotary anode has a substantially conical surface carried thereon which is symmetrical with respect to the rotational axis of the shaft. The conical surface receives the catcher bearings therein with a gap existing between the bearings and the surface during normal operation, and in the event of failure of the magnetic bearing system, functions as a contact surface to limit movement of the shaft and hence of the anode. The conical surface may be formed by two inwardly chamferred rings carried on the shaft with the catcher bearing disposed between the facing chamferred edges. The catcher bearing may be chamferred in a complementary manner and may have a ball bearing assembly therein.

17 Claims, 4 Drawing Figures

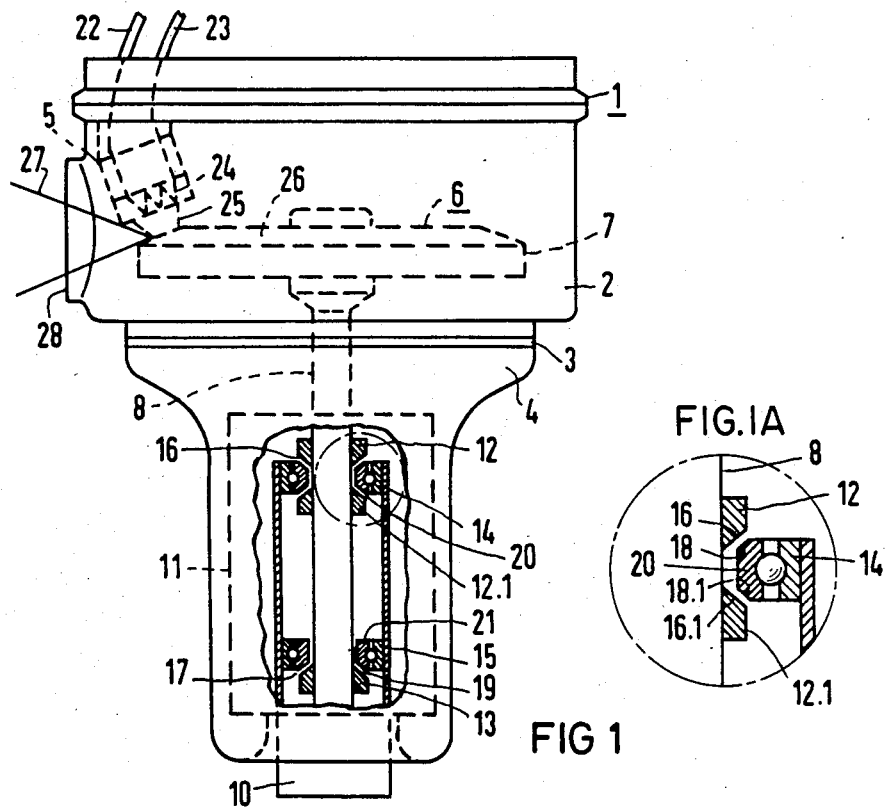
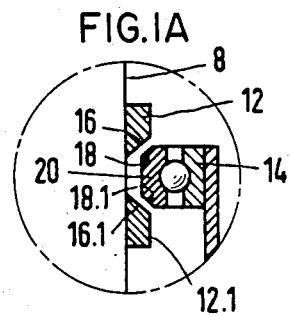
FIG. 1A
FIG 1
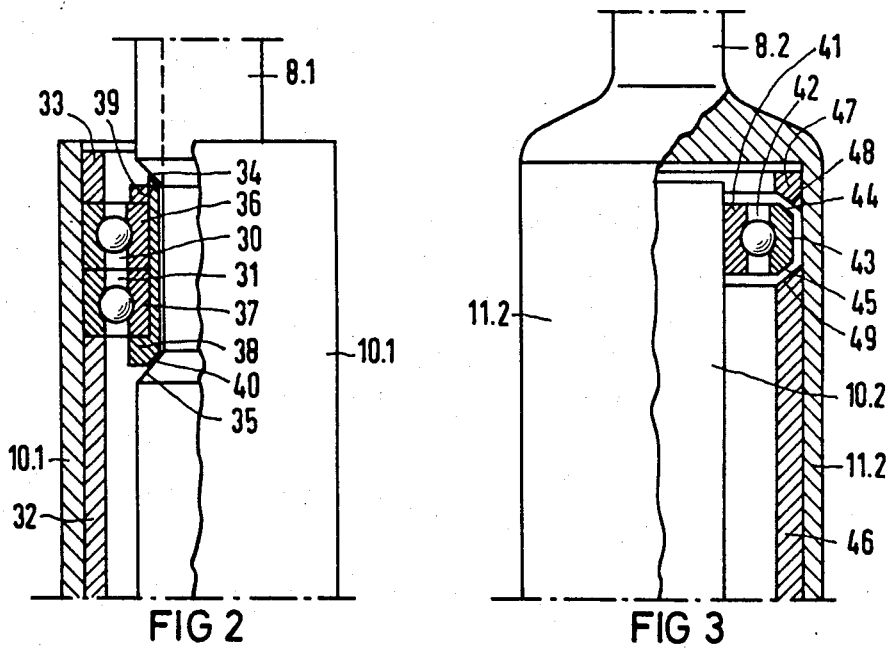
FIG 2
FIG 3

X-RAY TUBE WITH A MAGNETICALLY SEATED ROTARY ANODE

BACKGROUND OF THE INVENTION

1. Field of the Invention

The present invention relates to rotary anode x-ray tubes having a magnetic bearing means for normally supporting the anode, and in particular to an x-ray tube having catcher bearings for mechanically supporting the anode in the event of failure of the magnetic bearing means.

2. Description of the Prior Art

A rotary anode x-ray tube wherein the x-ray anode is normally supported by a mechanical bearing means is described, for example, in U.S. Pat. No. 4,167,671. This structure also has back-up mechanical bearings which are positioned so as not to support the anode shaft as long as the magnetic bearing system is operational, but which function for catching the rotary anode system if the magnetic bearing means fails for some reason, sometimes referred to as "plummeting" of the anode. When plummeting of the anode occurs, the normally non-contacting mounting of the shaft is no longer achieved, and portions of the rotary anode strike against the mechanical bearings, sometimes referred to as catcher bearings. The anode system will move to the extent permitted by the normal intervals or slack which is necessary to enable contact-free operation when the magnetic system is operational. Upon failure of the magnetic system, therefore, the anode becomes slightly canted and runs irregularly, this causing problems in operation due to vibration, abrasion, noise and the like.

SUMMARY OF THE INVENTION

It is an object of the present invention to provide a mechanical anode bearing assembly for use with an anode which is normally mounted by a magnetic bearing means which provides substantially impact-free, vibration-free and abrasion-free running of the anode even if the magnetic bearing system fails.

The above object is inventively achieved in a rotary anode for an x-ray tube wherein the shaft of the anode has a substantially conical, such as a frustoconical, annular surface carried thereon which is symmetrical with respect to the rotational axis of the anode. A stationary catcher bearing is disposed within the conical surface, and during normal operation with the magnetic bearing system functioning properly, the catcher bearing is spaced from the conical surface by a slight gap. The conical surface may be formed by spaced rings carried on the shaft, the rings having facing surfaces which are inwardly chamferred. The catcher bearing has a complementary chamferred surface. If the mechanical bearing system fails for some reason, the shaft, and thus the entire anode assembly, will move only slightly, to an extent no greater than the normal operational gap between the catcher bearing and the conical surface, and after moving the small distance will be evenly and stabily supported by means of the conical surface.

The catcher bearing may further include friction-reducing means such as a ball bearing assembly having an inner bearing race which is chamferred as described above to be received within the conical surface. When the anode plummets, the ball bearing assembly operates in a manner substantially the same as conventional mechanical bearing means for rotatary anodes. The use of such a ball bearing system as a mechanical bearing means for a rotary anode is described in the aforementioned U.S. Pat. No. 4,167,671. The complementary structure of the conical surface and the catcher bearings in the x-ray tube disclosed in the present application, however, provides significantly improved and abrasion and vibration free support for the anode, thus minimizing the major disadvantages in conventional devices. The x-ray tube can thus continue in use with mechanical support of the anode.

If the rotary anode shaft is generally vertically disposed during operation, it is sufficient that the conical surface and the complementary shaped catcher bearing be disposed opposite each other such that if plummeting occurs, one part falls upon the other and is maintained thereagainst without play. In another embodiment of the invention, the catcher bearing may be carried on the shaft, and the annular conical surface may be carried on a stationary portion of the x-ray tube with the same result.

In another embodiment of the invention another conical surface may be provided spaced from the first conical surface to provide further support in the event of plummeting. In some instances, it may be sufficient to utilize only a partial conical surface, which may be formed by one chamferred ring carried on the shaft.

In a preferred embodiment, the conical surface defines an angle of 90° at its tip, so that the facing walls each describe an angle of 45° with respect to the rotational axis of the anode drive shaft. A slight skew which is substantially in the center of the lateral movement experienced by the rotational axis of the anode during plummeting is thus obtained. This symmetry is thus not present for smaller or larger angles.

During normal operation, that is, with the magnetic bearing system operational, a gap between the conical surface and the catcher bearing in the range of about 0.2 through about 0.4 millimeters is preferable, particularly 0.25 millimeters. This amount of slack generally suffices to permit unimpeded operation of the magnetically seated anode because unavoidable normal lateral deviations in the rotation of the anode will not bring the surfaces into contact with such a gap.

DESCRIPTION OF THE DRAWINGS

FIG. 1 is a side view, partly broken away and in section, of a rotary anode x-ray tube constructed in accordance with the principles of the present invention, with an enlarged detailed depiction of a portion of the x-ray tube.

FIG. 1A is an enlarged side sectional view of the portion of FIG. 1 circumscribed by dot-and-dash lines.

FIG. 2 is a side view, partly in section, of a portion of a rotary anode tube constructed in accordance with the principles of the present invention showing a second embodiment of the mechanical catcher bearings.

FIG. 3 is a side view, partly in section, of a rotary anode tube constructed in accordance with the principles of the present invention showing another embodiment of the mechanical catcher bearings.

DESCRIPTION OF THE PREFERRED EMBODIMENTS

An x-ray tube constructed in accordance with the principles of the present invention is generally referenced at 1 in FIG. 1. The x-ray tube 1 has a metal housing portion 2 having an open side fused in vacuum-tight manner to a glass housing portion 4 at a seam 3. A cathode 5 and an anode assembly, generally referenced at 6, are disposed inside the metal hosuing portion 2 in a known manner. The anode assembly 6 has an anode disk 7 mounted on a drive shaft 8 which extends into a tubular connector 10 glazed to the glass housing portion 4. A rotor 11 is also attached to the drive shaft 8. For normal operation of the x-ray tube 1, the anode assembly 6 is rotated and is supported by a magnetic bearing arrangement of a type known to those skilled in the art, the details of which form no part of the present invention and are therefore not shown in FIG. 1.

The x-ray tube 1 shown in FIG. 1 is provided with additional mechanical catcher bearings 14 and 15 mounted on the connector 10. The drive shaft 8 is provided with spaced rings 12 and 12.1 disposed on opposite sides of the bearing 14, and an additional ring 13 disposed below the bearing 15. The rings 12 and 12.1 have respective chamferred facing surfaces 16 and 16.1 which in combination form a conical surface carried on the shaft 8. The depth of the conical surface may be selected as needed; in the embodiment shown in FIG. 1 the conical surface is a frustoconical surface. The bearing 14 has complementary chamferred surfaces 18 and 18.1. Similarly, the lower ring 13 has a chamferred surface 19 spaced from the bearing 15. The chamferred surfaces on the bearings 14 and 15 may be a part of an inner ball bearing race referenced at 20 for the bearing 14 and at 21 for the bearing 15. During normal operation, the inner races 20 and 21 will be spaced from the adjacent surfaces by an amount in the range of approximately 0.2 through 0.4 millimeters, preferably 0.25 millimeters.

During operation, the anode assembly 6 is placed in rotation in a known manner, and a filament voltage is applied across lines 22 and 23 and an accelerating voltage is applied across lines 22 and the connector 10. An electron beam 25 proceeds from the cathode coil 24 which is incident on the slanted surface 26 of the anode disk 7, thereby generating an x-ray beam 27 which proceeds through an exit window 28 of the metal housing portion 2.

If the magnetic support for the anode assembly 6 fails, the assembly 6 will fall onto one of the rings 12 or 13, depending upon the orientation of the x-ray tube 1, causing either the surfaces 16 and 18 or the surfaces 17 and 19 to come into contact with each other. If the x-ray tube 1 is horizontally disposed, the surface 16 of the ring 12, as well as the surface 17 of the ring 13, may come into contact with the surfaces of the respective inner races 20 adnand 21. Different combinations and degrees of contact will be achieved depending upon variations of the orientation of the x-ray tube 1 between vertical and horizontal.

In a further embodiment shown in FIG. 2, the mechanical bearing is in the form of a double bearing, achieving less bearing slack. The structure consists of two ball bearing assemblies 30 and 31 disposed at the inside wall of a connector 10.1 and are supported and retained by cylindrical sections 32 and 33. The shaft 8.1 of the anode assembly in this embodiment has a recess with chamferred side walls 34 and 35 describing an angle of 45° with respect to the longitudinal axis of the shaft 8.1. The inner races 36 and 37 of the bearing assemblies 30 and 31 are covered by an interior ring 38 which is shaped in a complementary manner to the recess of the shaft 8.1 so as to be received therein, the cover having lateral chamferred surfaces 39 and 40, also defining an angle of 45°.

Another embodiment is shown in FIG. 3 wherein the conical surface is carried on an inside portion of the anode shaft and the catcher bearings are disposed therein as well. The drive shaft 8.2 in this embodiment is joined directly to the rotor 11.2. The connector 10.2 in this embodiment is disposed inside the rotor 11.2 and has a bearing assembly 42 with an inner race 41 and an outer race 43. In this embodiment, the outer race 43 (rather than the inner race in the previous embodiments) of the bearing assembly 42 is provided with chamferred surfaces 44 and 45 and the interior wall of the rotor 11.2 is comprised of cylindrical sections 46 and 47 which extend up to a short distance from the outer race 43 of the bearing 44 leaving a gap of approximately 0.25 in the preferred embodiment. The surfaces of the cylindrical sections 46 and 47 facing the bearing 42 are chamferred at 48 and 49. It will be understood that various combinations of the separately shown embodiments may also be employed with departing from the inventive concept disclosed herein, such as by adding another lower bearing assembly to either of the embodiments shown in FIG. 2 or FIG. 3, or by designing the bearing shown in FIG. 3 as a double bearing such as shown in FIG. 2.

In the embodiments shown in FIGS. 1 through 3, the respective catcher bearing assemblies 14, 15, 30, 31 and 42 are rigidly built into the interior of the x-ray tube 1. In the embodiments of FIGS. 1 and 2, the outer bearing races are disposed against and attached to the connector 10 or 10.1. In FIG. 3, the inner bearing race 41 is disposed against the connector 10.2. It is within the inventive concept disclosed herein, however, to reverse the arrangement of the bearings and to connect them to the rotating portion of the anode assembly 6, that is, to the shaft 8 or 8.1, or to the interior wall of the rotor 11.2. The advantage of the embodiments shown in FIGS. 1 through 3 is that the bearing assemblies 14, 15, 30, 31 and 42 are rigidly connected to the tube in the operating condition of the tube and remain stationary, and thus do not contribute to increasing the mass of the rotary anode assembly 6.

Although other modifications and changes may be suggested by those skilled in the art, it is the intention of the inventor to embody within the patent warranted hereon all changes and modifications as reasonably and properly come within the scope of his contribution to the art.

I claim as my invention:

1. In an x-ray tube having a rotary anode having a drive shaft and a magnetic bearing means for normally magnetically seating said anode within said x-ray tube, and having a mechanical bearing means positioned for supporting said anode in the event of failure of said magnetic bearing means, the improvement in said mechanical bearing means comprising:

said mechanical bearing means having an annular conical surface disposed symmetrically with respect to the axis of rotation of said anode and a complementary mating surface received within said conical surface and normally spaced therefrom when said magnetic bearing means is operational, said complementary mating surface being further positioned for coming into contact with said conical surface and for supporting said anode in the event of failure of said magnetic bearing means.

2. The improvement of claim 1 wherein said conical surface is formed by two spaced annular chamferred rings having respective chamferred surfaces facing each other with said complementary mating surface received therebetween.

3. The improvement of claim 1 further comprising at least one ball bearing assembly having bearing races, and wherein said complementary mating surface is disposed on one of said bearing races.

4. The improvement of claim 3 wherein said complementary mating surface formed on one of said ball bearing races is formed by two chamferred surfaces on said bearing race.

5. The improvement of claim 3 wherein said ball bearing assembly surrounds said drive shaft and has an inner bearing race and an outer bearing race, and wherein said complementary mating surface is carried on said inner bearing race.

6. The improvement of claim 3 wherein said ball bearing assembly surrounds said drive shaft and has an inner bearing race and an outer bearing race, and wherein said complementary mating surface is carried on said outer bearing race.

7. The improvement of claim 3 wherein said ball bearing assembly is a double bearing assembly having two sets of bearing races each having ball bearings therein, and having a cover spanning both sets of races, and wherein said complementary mating surface is carried on said cover.

8. The improvement of claim 1 wherein said conical surface is disposed at an angle of 45° with respect to said axis of rotation of said anode.

9. The improvement of claim 1 wherein said conical surface and said complementary mating surface are normally spaced apart by a distance of about 0.2 millimeters through about 0.4 millimeters when said magnetic bearing means is operational.

10. The improvement of claim 9 wherein said conical surface and said complementary mating surface are normally spaced apart by a distance of 0.25 millimeters when said magnetic bearing means is operational.

11. The improvement of claim 1 wherein said x-ray tube has a housing, and wherein said conical surface is carried on said drive shaft and wherein said complementary mating surface is mounted on a portion of said housing.

12. The improvement of claim 1 further comprising said mechanical bearing means including a partial conical surface spaced from said conical surface and having a further complementary mating surface normally spaced from said partial conical surface when said magnetic bearing means is operational, said further complementary mating surface is being positioned for coming into contact with said partial conical surface and for further supporting said anode in the event of failure of said magnetic bearing means.

13. In an x-ray tube having a rotary anode with a drive shaft, a housing having a connector coaxial with said drive shaft, magnetic bearing means normally supporting said anode with said drive shaft out of contact with said connector, an improved mechanical bearing means for supporting said anode in the event of failure of said magnetic bearing means comprising:

two spaced rings carried on said drive shaft, said spaced rings having respective surfaces facing each other which are inwardly chamferred forming in combination an annular conical surface disposed symmetrically with respect to the axis of rotation of said drive shaft; and a ball bearing assembly carried on said connector and received in said conical surface, said ball bearing assembly having an inner race and an outer race, said inner race having two chamferred surfaces complementary to said chamferred surfaces of said two spaced rings, said inner race of said ball bearing assembly being disposed normally a short distance from said conical surface while said magnetic bearing means is operational, and positioned for coming into contact with said conical surface and for supporting said anode in the event of failure of said magnetic bearing means.

14. The improved mechanical bearing means of claim 13 wherein said drive shaft is received inside said connector.

15. The improved mechanical bearing means of claim 13 wherein said connector is received inside said drive shaft.

16. In an x-ray tube having a rotary anode with a drive shaft, a housing having a connector coaxial with said drive shaft, magnetic bearing means normally supporting said anode with said drive shaft out of contact with said connector, an improved mechanical bearing means for supporting said anode in the event of failure of said magnetic bearing means comprising:

said drive shaft having an annular recess having spaced inwardly chamferred surfaces forming an annular conical surface disposed symmetrically with respect to the axis of rotation of said drive shaft, said drive shaft being received inside said connector; and a double bearing assembly carried on said connector, said double bearing assembly having two adjacent inner bearing races and a cover spanning said inner bearing races, said cover having chamferred edges complementary to said chamferred edges of said recess and being received in said conical surface normally spaced therefrom when said magnetic bearing means is operational, and positioned for coming into contact with said conical surface and supporting said anode in the event of failure of magnetic bearing means.

17. The improved mechanical bearing means of claim 16 further comprising two cylindrical sections coaxial with said connector and said drive shaft and received inside and adjacent to said connector, said cylindrical sections being respectively disposed on opposite sides of said double bearing assembly for supporting and positioning said double bearing assembly.

* * * * *